Nov. 11, 1941.   W. HERRIOTT   2,262,584
SCANNING APPARATUS
Filed May 22, 1940        4 Sheets-Sheet 1

INVENTOR
W. HERRIOTT
BY
ATTORNEY

Nov. 11, 1941.  W. HERRIOTT  2,262,584
SCANNING APPARATUS
Filed May 22, 1940  4 Sheets-Sheet 2

INVENTOR
W. HERRIOTT
BY
C. A. Sprague
ATTORNEY

Nov. 11, 1941.  W. HERRIOTT  2,262,584
SCANNING APPARATUS
Filed May 22, 1940  4 Sheets-Sheet 3

INVENTOR
W. HERRIOTT
BY
ATTORNEY

Nov. 11, 1941.    W. HERRIOTT    2,262,584
SCANNING APPARATUS
Filed May 22, 1940    4 Sheets-Sheet 4

INVENTOR
W. HERRIOTT
BY
ATTORNEY

Patented Nov. 11, 1941

2,262,584

UNITED STATES PATENT OFFICE 2,262,584

SCANNING APPARATUS

William Herriott, Rockville Centre, N. Y., assignor to Bell Telephone Laboratories, Incorporated, New York, N. Y., a corporation of New York Application May 22, 1940, Serial No. 336,538

20 Claims. (Cl. 178—7.6)

This invention relates to scanning arrangements and particularly to a system for scanning a picture, printed page or other copy to derive image signals therefrom for transmission to a distant point.

An object of the invention is to provide improved apparatus for scanning flat copy.

Another object is to provide apparatus for scanning copy of wide ranges of size and thickness.

Another object is to provide apparatus into which a number of sheets of copy to be scanned may be prefed and which will scan each copy sheet as it reaches the scanning point with a minimum of attention from the attentant.

Another object is to provide means for maintaining a scanning beam continuously in sharp focus in a flat focal plane independent of angular motions of the scanning beam.

In furtherance of these and other objects there is provided, according to the invention in one of its forms, a copy-moving mechanism of novel arrangement which may comprise a belt of resilient material on which a sheet of copy to be scanned may be placed and which advances it intermittently past the scanning point, and a rigid guide which, in cooperation with the resilient belt, maintains the copy surface in a definite fixed plane, independent of its thickness. At the same time an oscillating mirror sweeps a spot of light, the image of an illuminated aperture, over each line of the copy to illuminate successive picture elements of the line, while a lens system brings about a conjugate focal relation between the illuminated aperture and an element of the line and a reciprocating movement of an element of the lens system, synchronized with the mirror oscillations, maintains this conjugate focal relation for other elements of the line, independent of changes in the angular position of the beam and consequent changes in total light path length.

The invention may profitably be embodied in a system for deriving image signals from copy being scanned. In such case, the light reflected from each illuminated picture element may be directed upon a photosensitive device, for example, a photoelectric cell. From the variations in the light intensity incident on this cell as the spot moves from a picture element of one degree of light and shade to another, there may be derived image signals related to the tone values of the picture and adapted to be transmitted to a distant point for reconstitution.

According to a modification, a whole line of the copy is flood-lighted at once and an image of this line is optically projected in the plane of an aperture behind which is mounted a photosensitive device, successive image points being swept past the aperture by an oscillating mirror while the image is kept in focus in the plane of the aperture by a synchronously moving lens, as above described.

The invention, which is capable of further modifications, will be fully understood by reference to the following detailed description of a preferred embodiment thereof, in which.

Figure 1:
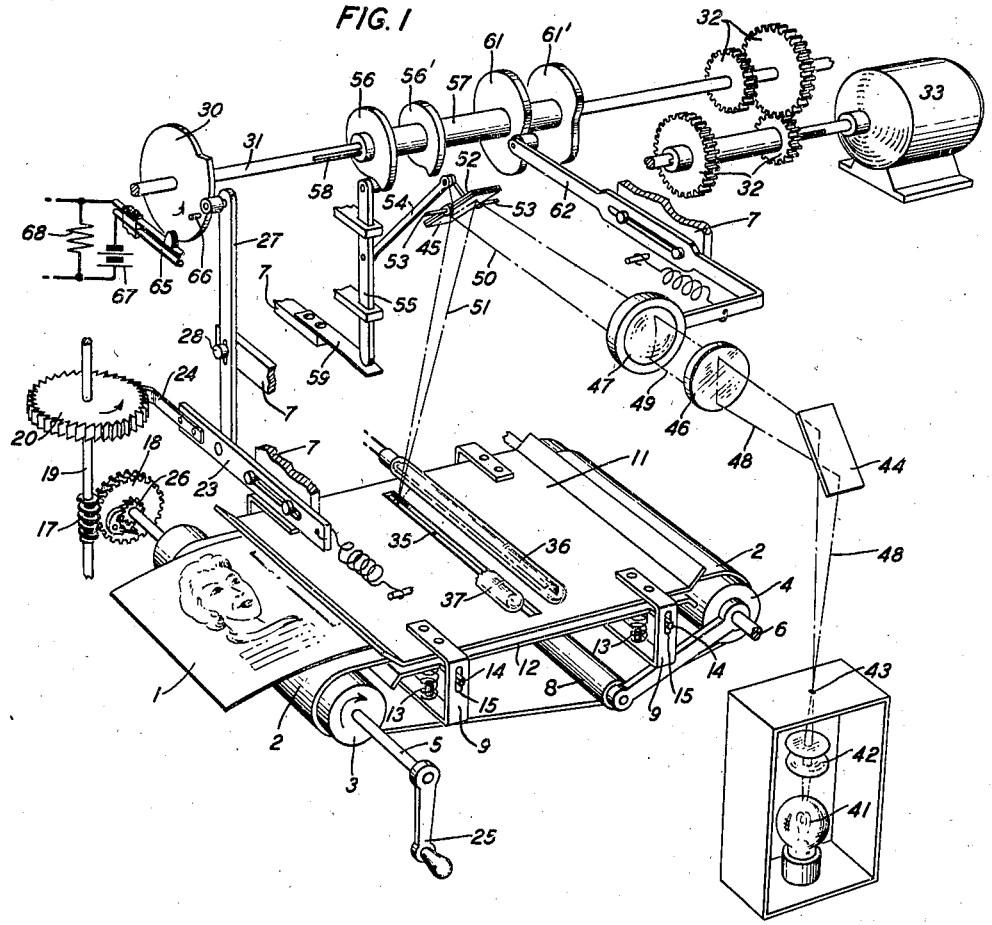
Fig. 1 is a schematic perspective view of copy-scanning apparatus according to the invention.

Referring now to Fig. 1, a sheet of copy 1 may be advanced by a supporting conveyor, for example, an endless belt 2 which passes around a driving roller 3 and a driven roller 4 which are arranged to turn on shafts 5 and 6 in journals, not shown, mounted on a framework 7 or base of the apparatus. Correct tension and flatness of the upper or working part of the belt may be secured by an idler roller 8 which may conveniently be swung on brackets pivoted at the journal points of one of the rollers, for example, the driven roller 4. Brackets 9 mounted on the framework of base 7 support two guide plates, an upper one 11 fixed to the brackets with its lower face in the plane of the upper surface of the upper part of the belt and bearing lightly against it, and a lower one 12 which is yieldably mounted as on springs 13 to bear against the reverse side of the same part of the belt, and press it lightly and snugly against the upper guide plate 11, being restrained from moving with the belt by pins 14 extending through slots 15 in the brackets 9. The lower surface of the fixed guide plate 11 is preferably finished by polishing or otherwise to a fine, smooth, flat surface.

It should be understood that terms such as "upper" and "lower" which may be employed in this specification with reference to the figures and as indicating parts of the apparatus are employed merely to avoid circumlocution, since the apparatus or any part thereof may of course be mounted in any desired orientation.

The belt 2 preferably comprises a fabric base to prevent excessive stretching and is provided with a resilient yielding upper surface, of substantial thickness, for example, of rubber.

The belt 2 is arranged to be intermittently advanced between the guides 11, 12, in short steps, for example 0.01 inch per step, through rotation of a worm 17 which meshes with a worm wheel 18 on the shaft 5 of the driving roller 3, the worm 17 being fixed to a shaft 19 which bears a ratchet wheel 20. A slotted bar 23, slidably mounted on pins secured to the framework 7, bears a spring pawl 24 which engages the teeth of the ratchet wheel 20 so that reciprocation of the bar 23 rotates the ratchet wheel 20 one tooth at a time.

A crank 25 may be mounted on the drive roller shaft 5 for rapid manual advancement of the belt, to permit which a free-wheeling device, for example, a ratchet and pawl 26, is interposed between the worm and the roller shaft.

The bar 23 may be given a reciprocating motion by a mechanical link 27, pivoted to the framework 7 at 28, which at one end is connected to the bar 23 by a pin and at the other end bears a follower which rides on a cam 30, mounted on a cam shaft 31 which is arranged to be driven through change speed gears 32 by a source of power, for example, a motor 33.

The upper guide plate 11 is pierced by a narrow slot 35 extending transversely of the belt 2 slightly less than the full width of the plate 11 and over a distance at least as great as the widest copy to be scanned. A beam of light 51 is projected, in a manner later to be described, onto the copy exposed in this slot 35, and the light reflected from the copy is utilized to provide picture signals. The upper edges of this slot 35 may be widely beveled to admit the scanning beam 51 and permit light reflected from the copy to emerge unimpeded; and the lower edges of the slot are preferably slightly rounded to prevent their catching and scratching or tearing the copy 1. The leading end of the plate 11 may be provided with a sloping riser to facilitate admission of the copy between it and the belt 2.

The guide plate 11 may, of course, be of transparent material, for example, plate glass, or it may be provided with a glass insert instead of a slot. However, on account of the fact that glass becomes scratched in use, the open slot above described is preferred.

A photosensitive device, for example, a long-cathode photoelectric cell 36 may be placed close to one side of the slot 35 and parallel with it, in a position to intercept the greatest possible amount of the light reflected from the copy 1. A similar cell 37 may be placed on the opposite side of the slot 35. If desired, any suitable arrangement of lenses may be employed to collect the light reflected by the copy and concentrate the greatest possible amount of it on the photoelectric cells 36, 37.

The optical system from which a scanning beam is derived will now be described. Light from a source 41 which may be of any suitable type is collected by a condensing lens 42 and directed upon a small aperture 43 of suitable size and shape. Since this aperture, together with the magnification of the optical system, defines the size and shape of a picture element, a rectangular aperture is preferred. In the case of an optical system of unit magnification, this may be 0.01 inch square. Its size will, of course, depend on the amount of resolution required and on the magnification of the optical system. A light beam 48, 49, 50, 51 from this aperture may be deflected by a stationary mirror 44, and a movable mirror 45 onto the sheet of copy 1 to be scanned where it is exposed in the slot 35 of the guide plate 11, and a sharp image of the illuminated aperture 43 focused on the copy by the lenses 46, 47.

The mirror 45 is preferably mounted vertically above the mid-point of the scanning slot 35 in a frame 52 which may be pivoted to rotate on journals 53 about an axis lying in the mirror face and fixed with respect to the apparatus framework 7. The rocking is effected by mechanical links 54, 55, one of which bears a follower which rides on the face of a cam 56 mounted on a sleeve 57 which is in turn slidably mounted on the shaft 31, being restrained from rotating about the shaft 31 by a spline which slides in a slot 58. The link 55 is pressed into engagement of its follower with the cam face 56 by a spring 59 so that its motion may be precisely governed by the cam 56 in the course of its revolution. The face of the cam 56 may be cut to produce any desired type of light beam motion, but a face in the form of a modified spiral of one revolution terminating in a sharp step is preferred, since this produces linear motion of the incident light beam 51 and scanning spot along each line of copy, with quick return to the starting point.

Figure 2:
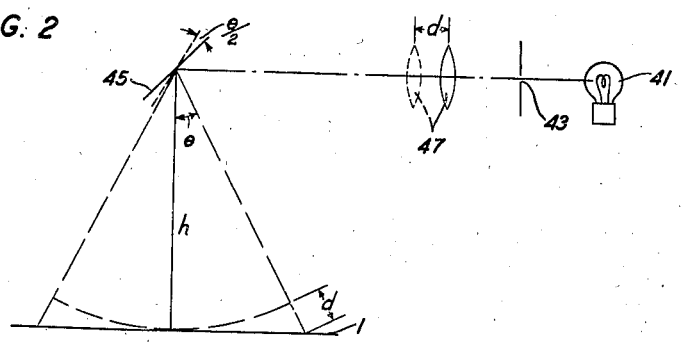
Fig. 2 is a diagram illustrating a principle of the invention.

A second cam 61, mounted on the same sleeve 57, bears against a follower and actuates a rod 62 slidably mounted on the framework 7, to which is attached one of the lenses 47, so that rotation of the shaft 31 produces axial reciprocation of the lens 47. The face of this second cam 61 is so cut, and the cam itself is so mounted on the sleeve 57 with respect to the mirror cam 56 as to give minimum separation of the lenses 46, 47 when the mirror 45 casts its reflected beam 51 toward the center of the slot 35, and maximum separation when the mirror casts its reflected beam toward either end of the slot, the displacement of the lens 47 being such as always to keep its focal plane coincident with the plane of the copy 1 and thus maintain a conjugate focal relation between the aperture 43 and successive picture elements of the copy line, independent of variations in the distance from the mirror 45 to the copy 1 which arise when the angle through which the light beam 50, 51 is reflected is altered. In the particular case shown in the figures, in which the rays of light 49 passing between the lenses 46, 47 are parallel, the displacement of the lens 47 from its position of greatest proximity to the lens 46 is at all points equal to the difference between the minimum or central distance from the mirror 45 to the copy 1 and the particular, actual or instantaneous distance. Thus, if in its mean position the ray 50, 51 is reflected through 90 degrees by the mirror 45, and the deviation of the ray from this position be denoted by $\theta$ and the vertical distance in this position from the mirror to the copy exposed at the mid-point of the slot 35 be denoted by $h$, then the axial displacement of the lens is given by $d = h \, (\sec \theta - 1)$, as will be understood from the diagram, Fig. 2.

It is a feature of this arrangement that the sweep of the portion 51 of the light beam over the copy sheet 1 is accompanied by no change in the magnification of the image of the aperture 43 which is focused on the copy sheet. The lengths of the light paths from the aperture 43 to the fixed lens 46 and from the movable lens 47 to the copy 1 are both unvarying while the portion 51 thereof is changed in its direction and deflection of it by the mirror 45 takes place at a point along the beam length which changes as the lens 47 and mirror 45 are moved. Therefore, the sum of the path lengths of the diverging and converging portions 48, 50, 51 of the light beam is invariant, the variation in total path length being entirely taken up in the parallel beam portion 49. As a result the image of the aperture 43 remains unchanged in magnification as it is being swept over the copy line in the course of scanning.

In the ideal case of cam followers of vanishingly small diameters, the face of the cam 61 could be cut according to the above formula. But, as will be understood by those skilled in the art, the necessity for a cam follower of finite diameter necessitates a departure of the cam from this idealized form. The actual cam, therefore, including this departure, is preferably cut empirically, as, for example, by following a geometrical construction.

Furthermore, in the general case in which the rays 49 passing between the lens 46, 47 are not necessarily parallel, the lens movement and therefore the cam face are more complex. Analytical relations for the lens movement may still be stated, but here again it is preferable to construct the cams empirically.

The operation of the apparatus of Fig. 1 for copy of the full width of the belt 2 will now be understood. The motor 33 being in operation and the light 41 burning, the belt 2 is moved intermittently past the scanning slot 35 in the guide 11 while a bright spot of light, namely the image of the aperture 43, is swept from end to end of the slot 35 during a stationary interval of the belt 2, and quickly returned, the return of the spot and the advance of the belt taking place simultaneously. The attendant may then place a sheet of copy 1 to be scanned on the belt 2 adjacent the beveled part of the guide 11. The copy is then gripped by the rubber upper face of the belt 2 and moved forward toward the scanning slot 35, the thickness of the copy, whether great or small, being taken up by yielding of the belt 2 itself or downward movement of the belt and lower guide 12 against the springs 13. Meantime, the light beam 51 scans the upper face of the belt where it is exposed through the slot, giving rise to currents in the photocells 36, 37 which correspond to a uniform dark background. When in the course of its step-by-step advance the copy 1 reaches the scanning slot 35, the spot of light commences to scan the copy, which normally has light areas as well as dark areas and may have areas of intermediate tone values as well. When the scanning spot reaches a light area or an area of intermediate tone value a greater amount of light is reflected therefrom to the photocells 36, 37 and correspondingly altered currents flow in the latter. Thus, as each line of the copy is scanned, image signals are derived from the photocells 36, 37 which are related to the brightness or degrees of light and shade of the successive picture elements of that line. These image signals, along with a suitable line synchronizing signal, may now be transmitted, after such amplification as may be desirable, to a distant point for reconstitution as a picture.

The line synchronizing signal may be derived in any convenient manner. For example, a spring switch 65 may be closed for a brief interval once for each revolution of the belt-moving cam 30 by a pin 66 fixed to the side of the cam 30 to allow current derived from a battery 67 or other source to flow through a resistor 68, and the resulting voltage drop across the resistor 68 utilized as the line synchronizing signal. Or, a reflecting element such as a prism may be movably mounted over the scanning slot in a position to direct the light beam onto an auxiliary photoelectric device. The attendant may place this reflecting element over the edge of the copy being scanned, whatever its width, and the auxiliary photoelectric device will then deliver a pulse each time the light beam reaches it.

The belt 2 and guide 11 may be many times as long as a copy sheet, in which case the operator may feed several sheets into the apparatus at once, advancing each one rapidly by turning the crank 25 to make room for the following sheet.

Figure 3:
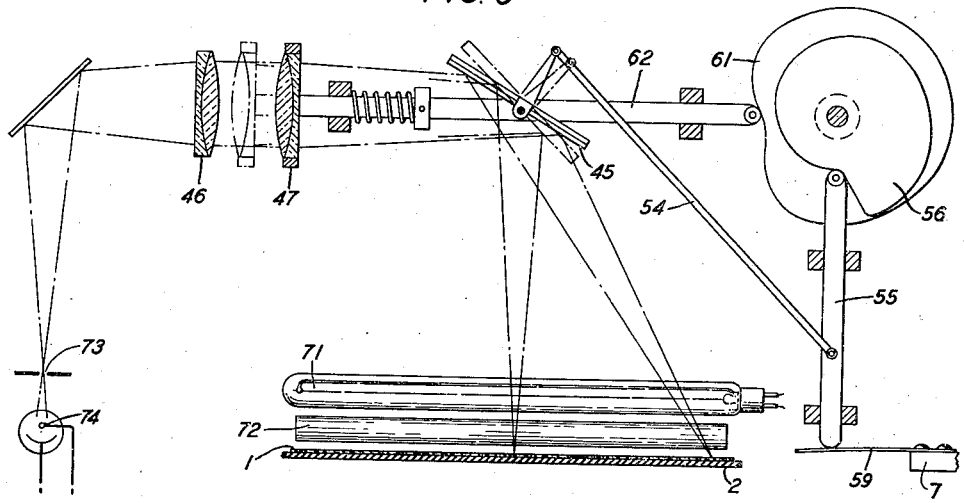
Fig. 3 is a detailed view of a modified form of optical system which may replace that of Fig. 1.

Instead of focusing an image of the aperture 43 on the copy 1 and receiving the light reflected from successive picture elements in a photoelectric device of large aperture as above described, the optical arrangement may be reversed, a whole line of copy being simultaneously illuminated and an image of this illuminated line focused in the plane of the aperture of a photoelectric device and swept past such aperture so as to image successive picture elements on the aperture in sequence. Such an arrangement is illustrated in Fig. 3, where a long line filament lamp 71 illuminates a whole line of the copy 1 at once, the light being concentrated by a cylindrical lens 72. An image of portions of this illuminated copy line, after reflection by the oscillating mirror 45, is focused on the aperture 73 behind which a photoelectric cell 74 is mounted. Movement of the lens 47 is effected as described above and serves to maintain the conjugate focal relation between the aperture and the successive picture elements independently of the distance of these elements from the mirror.

Figure 4:
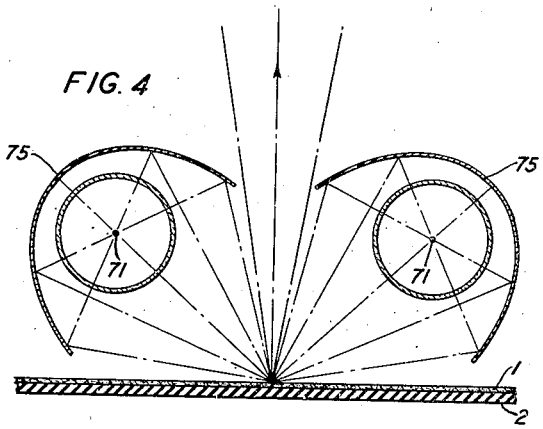
Fig. 4 is an enlarged sectional view of a modification of a part of the apparatus of Fig. 2.

Any desired arrangement of the light source of Fig. 3 may be employed, it being necessary only to provide strong illumination of the copy line. For example, two long-line filament lamps 71 may be employed instead of a single one, one being placed on either side of the slot. Moreover, as indicated in Fig. 4, reflectors 75 may be employed instead of lenses to concentrate the lamp light onto the copy line.

Figure 5:
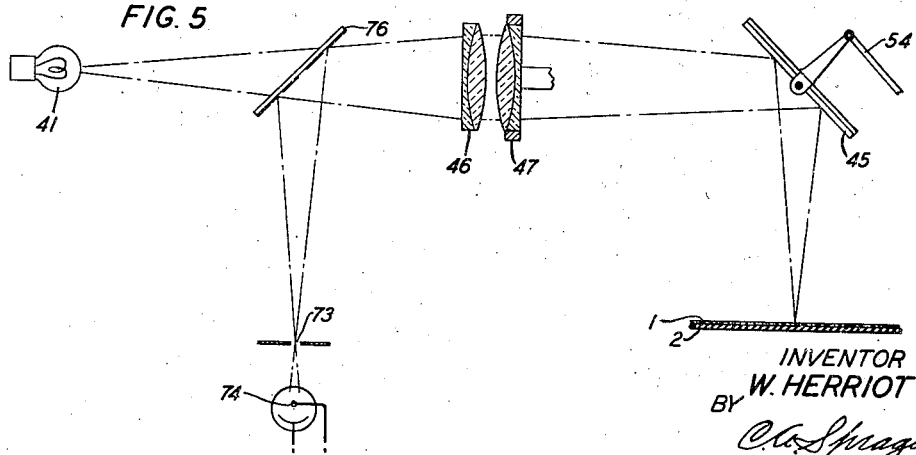
Fig. 5 is a diagrammatic view of an alternative to Fig. 3.

Should it be desired to keep both light source and photoelectric device at a distance from the copy, an arrangement such as that depicted in Fig. 5 may be employed, in which the light emanating from the source 41 and directed and focused on the copy 1 by lenses 46, 47 and oscillating mirror 45 then returns over the same or a closely adjacent path, ultimately to be directed through an aperture 73 into a photoelectric cell 74 by a suitable device such as a half-silvered mirror 76 interposed in the path of both incident and returning beam. It will be understood that the motion of the lens 47 and therefore the form of the face of the cam 61, if correct for maintaining focus of the beam incident on the copy 1, will likewise be correct for the beam reflected therefrom and returning through lenses 46, 47 to the photoelectric cell 74.

Figure 6:
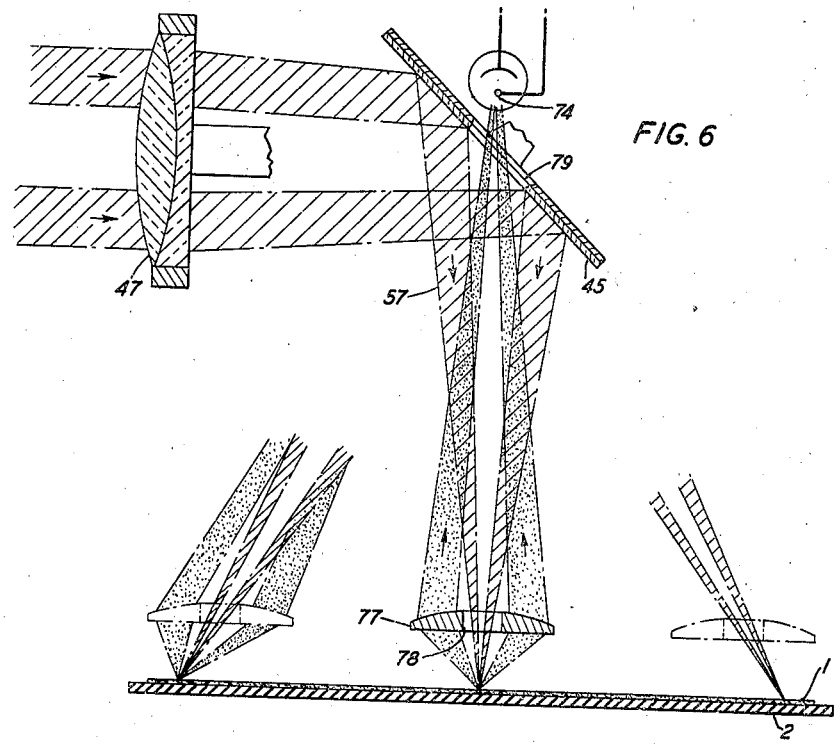
Figs. 6 and 7 show parts of two alternative arrangements of an optical system.
Figure 7:
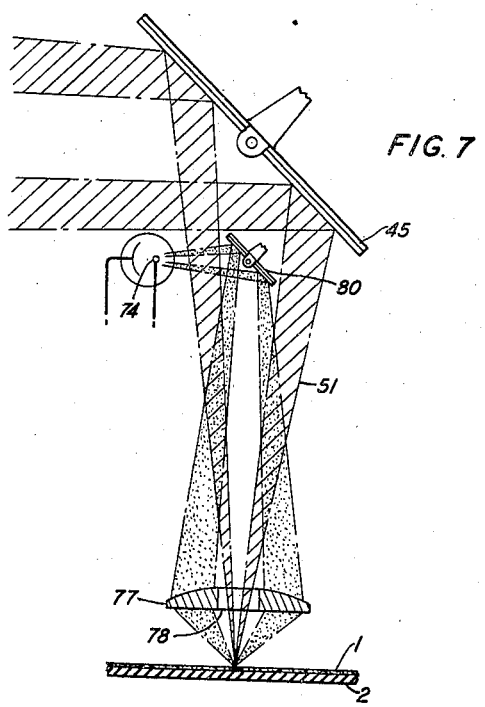

Figs. 6 and 7 show two forms of a modification of Fig. 5 in which the light reflected from the copy 1 is gathered by an additional lens 77 which swings to and fro over the copy, keeping pace with the incident beam 51. Any suitable means, such as a link mechanism, may be employed to produce the requisite motion of this auxiliary lens 77 in synchronism with the motion of the oscillating mirror 45. The auxiliary lens 77 may be provided with a central aperture 78 to admit the incident beam 51 to the copy 1 and the reflected beam may pass through an appropriately placed aperture 79 in the mirror 45 to a photoelectric cell 74, placed behind the latter as in Fig. 6, or it may be deflected by an auxiliary oscillating mirror 80 before reaching the main mirror 45 as in Fig. 7.

Figure 8:
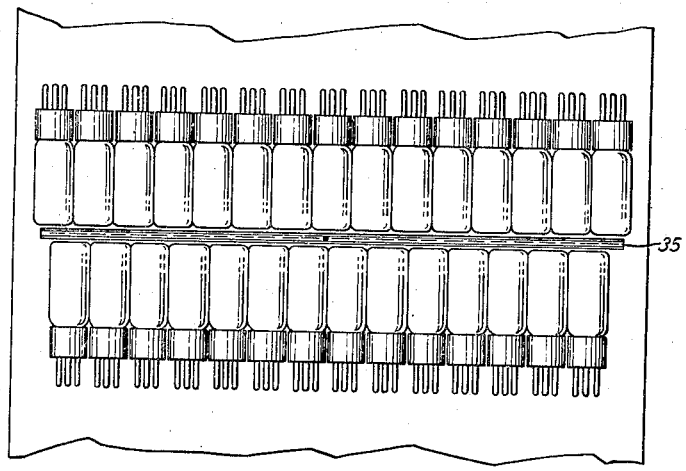
Fig. 8 shows an arrangement alternative to the photoelectric device of Fig. 1.

The photoelectric cells 36, 37 of Fig. 1 are provided with cathodes extending the full length of the scanning slot 35. If for any reason such long single cells should be inconvenient, they may be replaced by banks of smaller cells as shown in Fig. 8.

Various other modifications of the arrangements of light source and photoelectric cell will occur to those skilled in the art, as will also substitutions of equivalent elements for the various elements shown. For example, in any of the embodiments shown, an electron-multiplying device may replace the photoelectric cell; the oscillating mirror 45 may be replaced by a polyhedral mirror drum or a prism or other light deflecting device. The deflection may be by refraction as well as by reflection, as long as the dispersion which normally accompanies refraction is corrected for in any desired manner. The element 47 need not, in fact, be a lens, but may be any image forming device whose position determines the distance of the conjugate focal plane for the aperture 43. Indeed, by giving to the mirror 45 a complex motion, compounded of both translation and rotation, the conjugate focal relation may be maintained and the aperture 43 imaged on the plane of the copy 1 through the complex motion of this mirror alone, without the movement of any other element. All such arrangements are to be regarded as coming within the scope of the invention described above, rather than as departures therefrom.

As stated above, one of the objects of the invention is to provide apparatus wherewith copy of various widths may be scanned. This object is attained, in accordance with the modification of Fig. 1 by the provision of an additional pair of cams 56', 61' on the sleeve 57. When the copy to be scanned is of reduced width, for example, half a full width, the sleeve 57 may be slid axially along the shaft 31, taking cams 56 and 61 out of engagement with the respective followers and bringing cams 56' and 61' into engagement therewith. The cam 56' may be cut to return the mirror 45 to its initial position after swinging the beam 51 over one-half the length of slot 35 and the cam 61' cut to preserve sharp focus of the image of the aperture 41 on the copy 1 throughout the resulting reduced beam motion. Since, under these conditions, the speeds of the individual moving parts will have been greatly reduced, the speed of the apparatus as a whole may be increased, as by shifting the gears 32, thereby effecting an increase in the speed of transmission of the picture.

No attempt has been made in the drawings to exhibit the precise forms of the cam faces. Rather the description of the operation and effect of these cams should be taken as determining their forms.

Figure 9:
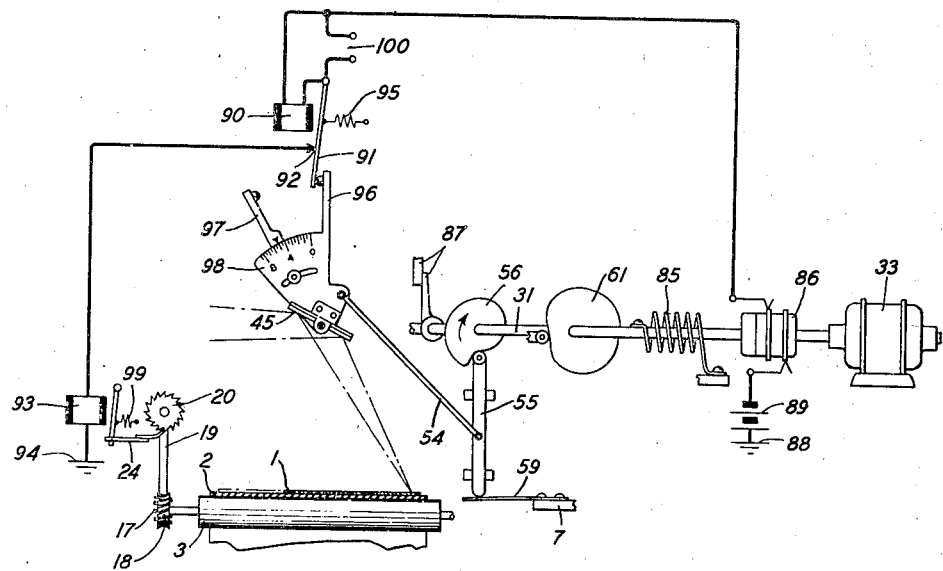
Fig. 9 is a schematic diagram of an arrangement alternative to another portion of Fig. 1.

Fig. 9 indicates schematically a modification adapted to scanning copy of any width equal to or less than the capacity of the apparatus, which is limited only by the length of the scanning slot 35. For this arrangement the shaft 31, instead of being rotated continuously as in Fig. 1, is rotated through a preassigned angle against the tension of a shaft-returning spring 85 and then, upon the release of a magnetic clutch 86, snapped back to its starting point where its motion is arrested by stops 87. The clutch 86 is energized from a source 89 and the electric circuit is completed through a relay 90, contacts 91, 92, and another relay 93. The current through the relay 90 may be adjusted to hold the contacts 91, 92 closed against the tension of a spring 95 when the current is flowing. The scanning mirror 45 is provided with two arms 96, 97, one of which is adjustable with respect to the other, the angle between them being measurable by a scale 98 which may be graduated in units of copy width. The arm 96 is positioned to close the contacts 91, 92 when the mirror is in position to direct the scanning beam to the beginning of a line and so permit the clutch 86 to be energized and scanning to commence. The arm 97 is positioned to open the contacts 91, 92 when the mirror has been swung through an angle preset on the scale 98, corresponding to a sweep of the scanning beam over a full line of copy of reduced width. When these contacts 91, 92 are thus opened, not only is the circuit of the magnetic clutch 86 opened, thus permitting the spring 85 to return the cam shaft 31 and therefore the mirror 45 and the lens 47 toward their starting points, but at the same time relays 90 and 93 are deenergized. Release of the armature of relay 93 permits the spring 99 to urge the pawl 24 against the ratchet 20 and so advance the driving roller 3 and the copy 1 by the width of one line. Meantime spring 95 holds the contacts 91, 92 open until the return sweep of the scanning beam is complete. Thereupon the arm 96 closes them once more to allow the clutch 86 and the relays 90 and 93 to be energized. The cycle of operations then recommences and proceeds as before.

The terminals 100 of the relay coil 90 provide points across which will appear a voltage during each scanning sweep and no voltage drop during the beam return. This voltage may conveniently be utilized as a line synchronizing signal for transmission to a receiver station, though of course a line synchronizing signal may be derived in any one of a number of different ways.

Various modifications of the invention in any or all of its features will occur to those skilled in the art. For example, other types of light-deflecting elements than the mirror and lens shown may be employed to maintain the conjugate focal relation of the invention, and mechanisms other than cams may be utilized to secure the requisite motions of these elements. Additionally, means other than the yielding belt described above may be employed to maintain the upper face of the copy sheet precisely in the focal plane. Moreover, uses of the apparatus and principles of the invention other than for facsimile transmission or scanning may well arise. Each such use and each such modification may well fall squarely within the scope of the invention in its broad aspects.

What is claimed is:

1. Optical scanning apparatus comprising a light-directing means for receiving a beam of light diverging from a region of small cross-sectional area and for reforming said received beam into a converging beam and directing it to a second region of small cross-sectional area, said regions being substantially in conjugate optical relationship with each other, said light-directing means including movable means for (1) sweeping the smaller end of one of said beams along a linear path consisting of elemental regions located at progressively different distances from the smaller end of the other of said beams and (2) for automatically maintaining, during said sweeping operation, a substantially conjugate focal relationship between the smaller ends of said two beams.

2. Optical scanning apparatus comprising a light-directing means for receiving a beam of light diverging from a region of small cross-sectional area and for reforming said received beam into a converging beam and directing it to a second region of small cross-sectional area, said regions being substantialy in conjugate optical relationship with each other, said light-directing means including movable means for sweeping the smaller end of one of said beams along a linear path including one of said small regions and other similiar regions, reciprocable light-converging or light-diverging means, and means for simultaneously moving said beam-sweeping means and said reciprocable means to maintain during said sweeping operation, conjugate focal relationships between the smaller ends of said two beams.

3. Scanning apparatus comprising a fixed plate-like element, a second similar plate-like element, resilient means urging a face of said second plate-like element toward a face of said fixed plate-like element, a web-like element of resilient material between said faces and adapted to carry copy to be scanned and to maintain the surface thereof to be scanned in contact with said face of said fixed plate-like element, means for moving said web-like element between said faces, and optical means for scanning said copy line by line as it is being moved.

4. Scanning apparatus comprising a fixed plate-like element, a web-like element of fabric having a resilient frictional coating thereon, means for moving said web-like element past said fixed plate-like element while urging said resilient frictional coating into contact with a surface of said fixed plate-like element over a wide area of said plate-like element, whereby flat copy to be scanned may be placed on said resilient frictional coating and carried along thereby in slidable contact with said surface of said fixed plate-like element, and optical means for scanning said copy line by line as it is moved along said surface.

5. Scanning apparatus comprising a fixed plate, a belt of fabric with a resilient frictional coating thereon, means for moving said belt past said fixed plate while urging said resilient frictional coating into contact with the surface of said fixed plate over a wide area of said plate, whereby flat copy to be scanned may be placed on said resilient frictional coating and carried along thereby in slidable contact with said surface of said fixed plate, and optical means for scanning said copy line by line as it is moved along said surface, means comprising a roller driving said belt, means for manually turning said roller to advance said belt as desired and means for driving said roller to automatically move said belt step by step in synchronism with said line-by-line scanning.

6. In scanning apparatus, means for generating a scanning beam of light, means for angularly sweeping said beam over a surface scanned, reciprocable light-converging or light-diverging means in the path of said beam, a shaft, means for driving said shaft, and cams on said shaft for respectively reciprocating said reciprocable means and for controlling the movement of said scanning beam.

7. In scanning apparatus, means for generating and moving a scanning beam of light, reciprocable light-converging or light-diverging means in the path of said beam, a shaft, a sleeve slidable on said shaft and movable therewith, a pair of cam elements on said sleeve for respectively moving said reciprocable element and for controlling the movement of said scanning beam according to a preassigned relation and in preassigned amounts, a second pair of cam elements on said sleeve for respectively performing the functions of said first cam elements according to said relation but by different amounts, means for rendering effective either of said pairs of cams as desired and means for driving said shaft at different speeds dependent upon which set of cams is made effective.

8. In scanning apparatus, means for generating a beam of light, means for periodically sweeping a portion of said beam over a line of copy to be scanned, reciprocable light-deflecting means in the path of another portion of said beam for maintaining successive points of said line in conjugate optical focal relation with a fixed point, and means for intermittently advancing said copy line by line between successive scans.

9. In scanning apparatus, means for generating a scanning beam of light, means for swinging a part of said beam through a preassigned angle to scan a line of copy, a reciprocable light-converging or light-diverging element in the path of said beam, means for moving said element in relation to the angular movement of said beam-swinging means to maintain successive points of said copy line in conjugate focal optical relation with a fixed point, and means for adjusting at will said preassigned angle in related conformity with the length of said copy line.

10. In scanning apparatus, means for generating a scanning beam of light, means for angularly sweeping said beam, a reciprocable light-converging or light-diverging element in the path of said beam, a pair of cams for respectively sweeping said beam-moving means and said reciprocable element, means for periodically turning said cams through a preassigned angle and returning them to their starting points, and means for adjusting said preassigned angle at will.

11. In scanning apparatus, a light source, a light receiver, means for directing a beam of said source onto a line of copy to be scanned, means for sweeping said incident beam over said copy line, said beam-sweeping means being disposed to receive light reflected from said copy and direct it as a reflected beam toward said receiver, and reciprocable means for maintaining a conjugate focal optical relation between said light receiver and successive points of said copy line during the beam-sweeping operation.

12. A system for scanning a surface along a straight line so as to maintain all points of said line in conjugate focal optical relation with a fixed point, which comprises an angled optical path extending between said fixed point and a point in said line, a mirror disposed at the angle of said path to reflect a light beam along said path, a lens interposed in said path and arranged to bring said point of said line into conjugate focal relation with said fixed point, means for rocking said mirror to bring other points of said line successively into said conjugate focal relation, and means, synchronized with said mirror-rocking means, for reciprocating said lens to maintain said conjugate focal relation for said other points despite rocking movements of said mirror.

13. Apparatus for scanning a copy sheet of random thickness, which comprises a base of yielding material adapted to be placed in contact with a face of said copy sheet, an unyielding guide frame disposed to engage the other face of said sheet and maintain it at a fixed distance from a fixed point independent of the thickness of the sheet, means for moving said base, supporting said sheet, parallel to said frame, and optical means for scanning the second-named face of the sheet as it is being moved.

14. Apparatus for scanning a flat copy sheet of random thickness, which comprises a plane base of yielding material adapted to be placed in contact with one face of said sheet and to support said sheet, means for maintaining the other face of said sheet in a fixed plane independent of the thickness of said sheet, a light source, means for producing a stationary light beam from said source, movable light-deflecting scanning means in the path of said stationary beam for converting it into a movable beam and for sweeping it periodically across a plane surface, light-deflecting means in the path of said stationary light beam, and means for reciprocating said last-mentioned means in a direction parallel to said beam in synchronism with movements of said movable scanning means.

15. In apparatus for scanning a flat copy sheet of random thickness, the combination of a copy-moving mechanism which comprises a plane base of yielding material adapted to be placed in contact with one face of said copy sheet and to support said sheet, an unyielding guide frame disposed to engage the other face of said sheet and maintain it in a fixed plane independent of the thickness of said sheet, and means for moving said base, supporting said sheet, in one direction, with a system for scanning said sheet along a straight line so as to maintain all points of said line in conjugate focal optical relation with a fixed point which comprises an optical path extending between said fixed point and a point in said line, an optical element disposed in said path to deflect a light beam along said path, a second optical element interposed in said path and arranged to bring said point of said line into conjugate focal relation with said fixed point, means for angularly moving the first-named element to bring other points of said line successively into said conjugate focal relation, and means, synchronized with said last-named means, for moving the second-named element to maintain said conjugate focal relation for said other points despite angular movements of said first-named element.

16. In scanning apparatus, means for generating a scanning beam of light, means for angularly sweeping a portion of said beam over a random length line of copy to be scanned, a reciprocable light-converging or light-diverging element for swinging said beam-sweeping means between preassigned positions, means for reciprocating said reciprocable element in coordinate relation with said swinging motion, a continuously moving element, an intermittently operative coupling between said movable element and said continuously moving element, and automatic means for rendering said coupling operative in one of said preassigned positions and inoperative in the other of said preassigned positions.

17. Apparatus for scanning a flat surface along a straight line which comprises a source of light, means for deflecting a beam of light from said source through an angle $\theta$, and means synchronized with said last-named means for focusing said deflected beam at a distance $r$ from said beam-deflecting means given by $$r = h \sec \theta$$

where $h$ is a constant.

18. Apparatus for scanning a flat surface along a straight line which comprises a source of light, a rotatable light-deflecting element disposed on a line perpendicular to said scanning line, means for rotating said element through an angle $\theta/2$, a translatable light-deflecting element for receiving light from said source and directing it toward said rotatable element, and means for translating said translatable element through a distance $$d = h (\sec \theta - 1)$$

where $h$ is a constant, in synchronism with the rotation of said rotatable element.

19. In scanning apparatus, means for generating a beam of light, means for angularly sweeping a portion of said beam over a line of copy to be scanned, a reciprocable light-deflecting means in the path of another portion of said beam for maintaining successive elemental areas of said line in conjugate focal relation with a fixed area and for maintaining invariant the magnification between said fixed area and each of said successive elemental areas.

20. In scanning apparatus, a sheet of flat copy to be scanned, a source of a beam of light, a fixed light-deflecting element in the path of a portion of said beam diverging from said source and arranged to convert said diverging beam portion into a parallel beam portion, a reciprocable light-deflecting element in the path of said parallel beam portion and arranged to convert said parallel beam portion into a beam portion converging onto an area of a line of said copy sheet and to form thereon an image of said source at a preassigned magnification, means for angularly sweeping said converging beam portion over a line of said copy sheet, whereby the total light path length from said light source to said image is altered, and means for reciprocating said reciprocable element with a movement coordinated with that of said beam-sweeping means, to alter the length of said parallel beam portion in correspondence with said total light path length alteration to maintain said image in focus at said preassigned magnification.

WILLIAM HERRIOTT.